US007113903B1

(12) United States Patent
Riccardi et al.

(10) Patent No.: US 7,113,903 B1
(45) Date of Patent: Sep. 26, 2006

(54) METHOD AND APPARATUS FOR PROVIDING STOCHASTIC FINITE-STATE MACHINE TRANSLATION

(75) Inventors: Giuseppe Riccardi, Hoboken, NJ (US); Srinivas Bangalore, Hackettstown, NJ (US)

(73) Assignee: AT&T Corp., New York, NY (US)

( * ) Notice: Subject to any disclaimer, the term of this patent is extended or adjusted under 35 U.S.C. 154(b) by 682 days.

(21) Appl. No.: 10/058,995

(22) Filed: Jan. 30, 2002

Related U.S. Application Data

(60) Provisional application No. 60/264,976, filed on Jan. 30, 2001.

(51) Int. Cl.
*G10L 15/00* (2006.01)

(52) U.S. Cl. .............................................. 704/4; 704/2

(58) Field of Classification Search .................... 704/2, 704/4
See application file for complete search history.

(56) References Cited

U.S. PATENT DOCUMENTS

| | | | | |
|---|---|---|---|---|
| 5,675,707 | A | 10/1997 | Gorin et al. | |
| 5,805,832 | A * | 9/1998 | Brown et al. | 711/1 |
| 5,991,710 | A * | 11/1999 | Papineni et al. | 704/2 |
| 6,345,244 | B1 * | 2/2002 | Clark | 704/2 |
| 6,393,389 | B1 * | 5/2002 | Chanod et al. | 704/7 |

* cited by examiner

*Primary Examiner*—Daniel Abebe

(57) ABSTRACT

A method and apparatus for stochastic finite-state machine translation is provided. The method may include receiving a speech input and translating the speech input in a source language into one or more symbols in a target language based on stochastic language model. Subsequently, all possible sequences of the translated symbols may be generated. One of the generated sequences may be selected based on a monolingual target language model.

11 Claims, 5 Drawing Sheets

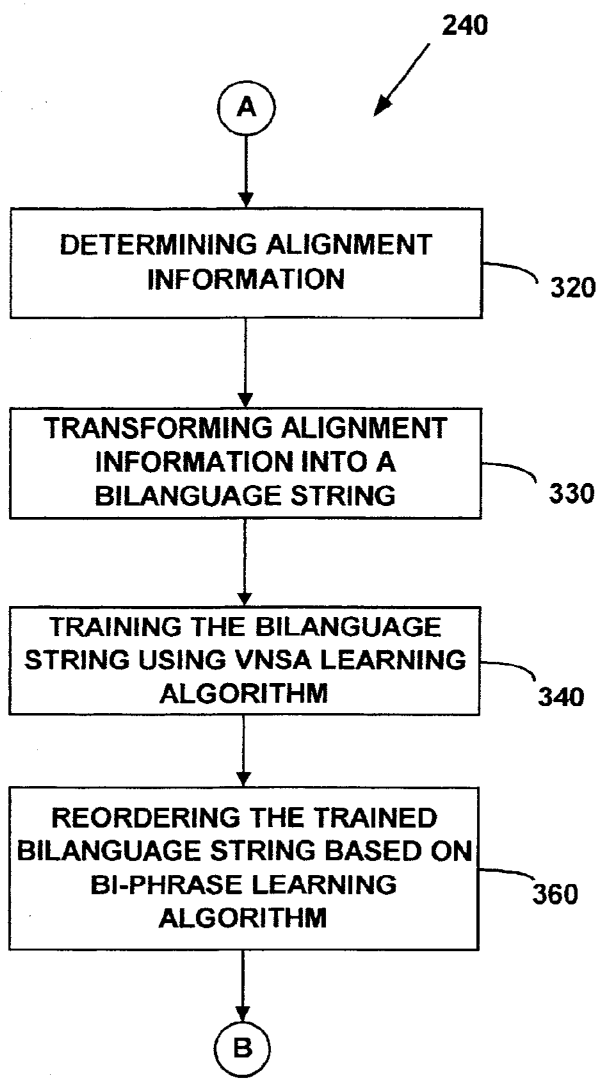
FIG. 3
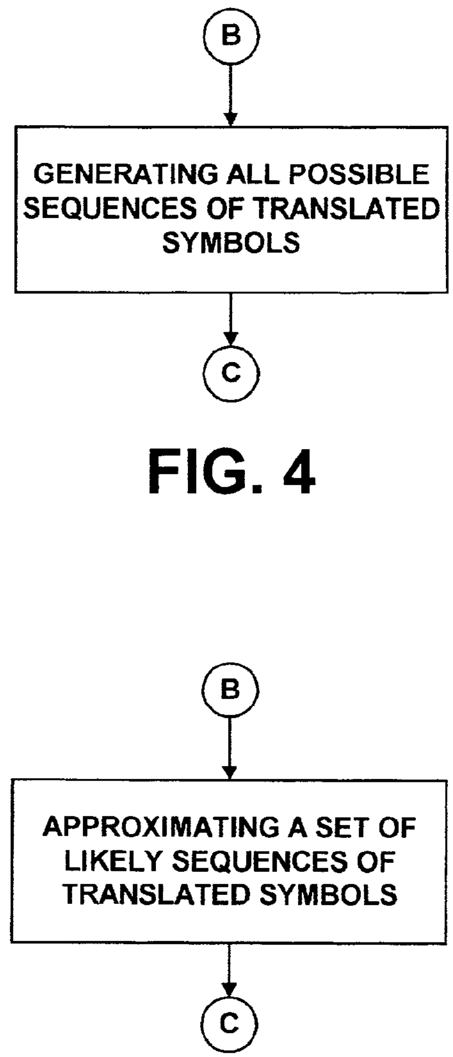
FIG. 4
FIG. 5

Ws : ajá quiero usar mi tarjeta de crédito

WT : yeah I wanna use my credit card

Alignment : 1 3 4 5 7 0 6

$$F(W_S, W_T) = \text{(ajá,yeah) } (\varepsilon,\text{I}) \text{ (quiero,wanna) (usar,use) (mi,my) (tarjeta,card) } (\text{de}, \varepsilon) \text{ (crédito,credit)}$$

FIG. 8

METHOD AND APPARATUS FOR PROVIDING STOCHASTIC FINITE-STATE MACHINE TRANSLATION

CROSS REFERENCE TO RELATED APPLICATIONS

This non-provisional application claims the benefit of U.S. Provisional Application No. 60/264,976, filed on Jan. 30, 2001, entitled "Stochastic Finite-State Models for Spoken Language Translation." The disclosure of the aforementioned provisional is incorporated herein by reference in its entirety.

TECHNICAL FIELD

The present invention generally relates to a system and method for machine language translation. More particularly, the invention relates to a system and method for stochastic finite state machine translation, wherein the stochastic finite state machine is trained automatically from pairs of source and target utterances.

BACKGROUND OF THE INVENTION

Finite state models (FSMs) have been extensively applied to many aspects of language processing including speech recognition, phonology, morphology, chunking and parsing. FSMs are attractive mechanisms for language processing because they are efficiently learnable from data and generally effective for decoding. Also, FSMs are associated with a calculus for composing a model, which allows for straightforward integration of constraints from various levels of language processing.

A conventional machine translation process includes two phases: (a) lexical choice phase where appropriate target language lexical items are chosen for each source language lexical item; and (b) reordering phase where the chosen target language lexical items are reordered to produce a meaningful target language string. With respect to the lexical choice phase, the conventional methods for constructing a bilingual lexicon use a string-based alignment. However, these conventional approaches incur the expense of creating a permutation lattice for recording and are, thus, less attractive.

SUMMARY OF THE INVENTION

In accordance with the present invention, a method and apparatus for providing stochastic finite-state machine translation is provided. The method may include receiving an input in a source language and translating the input in the source language into one or more symbols in a target language based on stochastic translation model. Subsequently, a plurality of possible sequences of the translated symbols may be generated. One of the generated sequences may be selected based on a monolingual target language model.

The apparatus for stochastic finite-state machine may include a recognizer for receiving an input and decomposing the input into one or more symbols in a source language. The recognizer may be connected to a lexical selection unit for translating one or more symbols in the source language into symbols in a target language with reference to a first model database. The lexical translation unit may be connected to a reordering unit. The reordering unit may generate all possible sequences of the translated symbols. Alternatively, the reordering unit may approximate a set of likely sequences through a training process. Outputs from the reordering unit may then be fed into a refining unit for selecting one of the possible sequences of the translated symbols with reference to a second model database.

BRIEF DESCRIPTION OF THE DRAWINGS

The various advantages of the present invention will become apparent to one skilled in the art by reading the following specification and appended claims, and by referencing the following drawings, in which:

FIG. 3 is a detailed flowchart depicting a step 240 of translating symbols in source language into symbols in target language illustrated in FIG. 2, in accordance with the present invention;

FIG. 4 is a detailed flowchart depicting a step 250 of generating a plurality of possible sequences illustrated in FIG. 2, in accordance with one embodiment of the present invention;

FIG. 5 is a detailed flowchart depicting a step 250 of generating a plurality of possible sequences illustrated in FIG. 2, in accordance with another embodiment of the present invention;

FIG. 8 is an exemplary string from the alignment shown in FIG. 6 and FIG. 7, in accordance with the present invention.

DETAILED DESCRIPTION

Both foregoing and following descriptions are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

Figure 1:
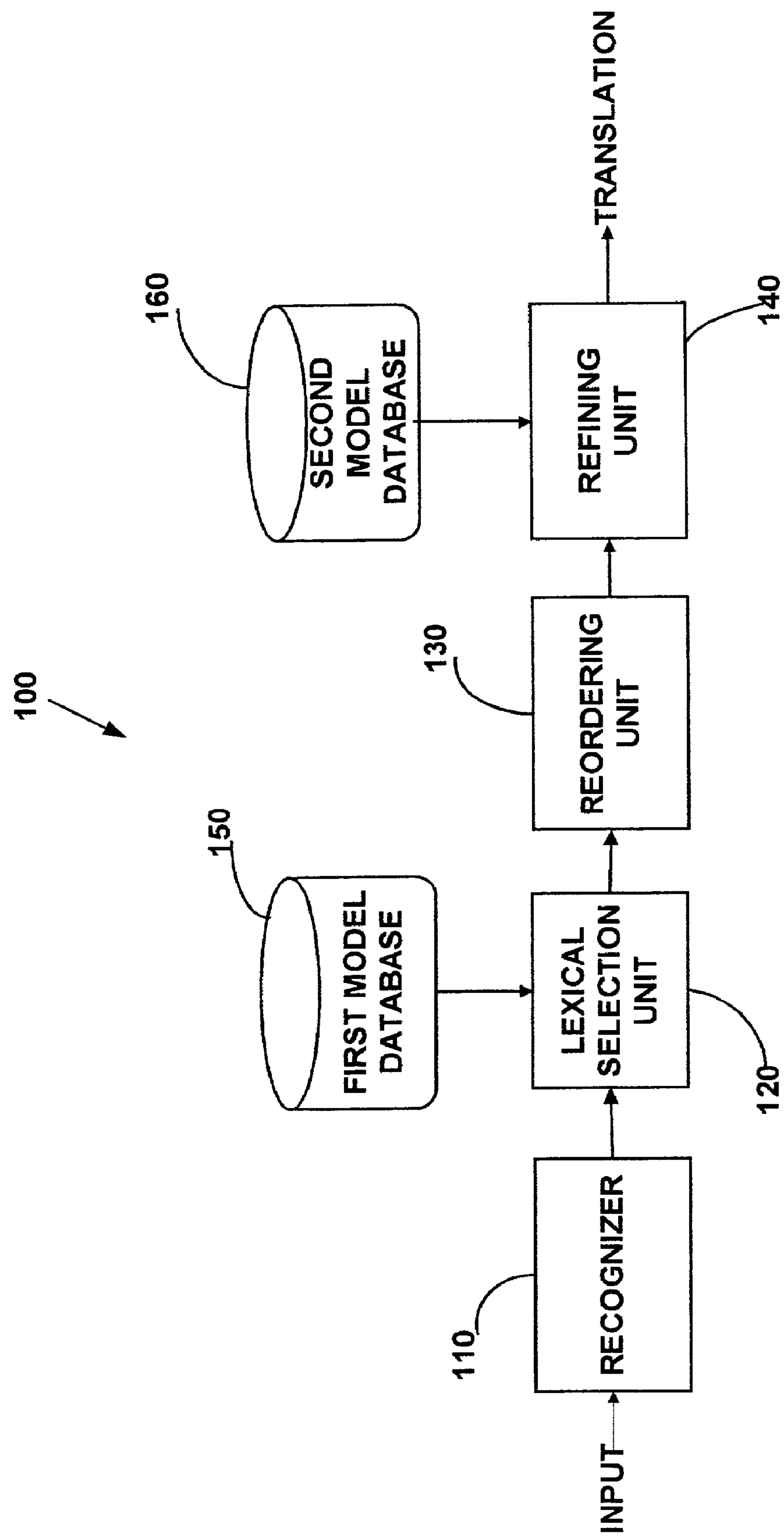
FIG. 1 is a block diagram illustrating a stochastic finite state model for machine translation, in accordance with the present invention.

Referring to FIG. 1, an exemplary stochastic finite state model (SFSM) for language translation 100 is illustrated in accordance with the present invention. The SFSM 100 includes a recognizer 110, which receives an input in a source language. The recognizer 110 decomposes the input into one or more symbols in the source language. The recognizer 110 is connected to a lexical selection unit 120, which is also connected to a first model database 150. By referring to the first model database 150, the lexical selection unit 120 translates one or more symbols in the source language into symbols in a target language. In one embodiment of the present invention, these symbols are words.

However, it should be understood that the symbols may also represent sentences, phrases, morphemes, phonemes, bi-grams, and tri-grams, etc.

In accordance with the present invention, the first model database 150 is a stochastic translation model database that provides for a bilingual lexicon in translating the input. The output port of the lexical selection unit 120 is connected to a reordering unit 130 for generating a plurality of possible sequences of the target language symbols. More specifically, in one embodiment of the present invention, the reordering unit 130 generates all possible sequences of the symbols in the target language. In accordance with another embodiment of the present invention, the reordering unit 130 approximates a set of likely sequences of the symbols in the target language.

These sequences generated by the reordering unit 130 are then transmitted to a refining unit 140, which is connected to a second model database 160. In the preferred embodiment of the present invention, the second model database 160 is a monolingual target language model database. The refining unit 140, by referring to the monolingual target language model database 160, selects one of the possible sequences of the target language symbols. The selected sequence of the target language symbols represents the most likely translation of the input. The selected sequence of the target language symbols is then output from the refining unit 140.

Figure 2:
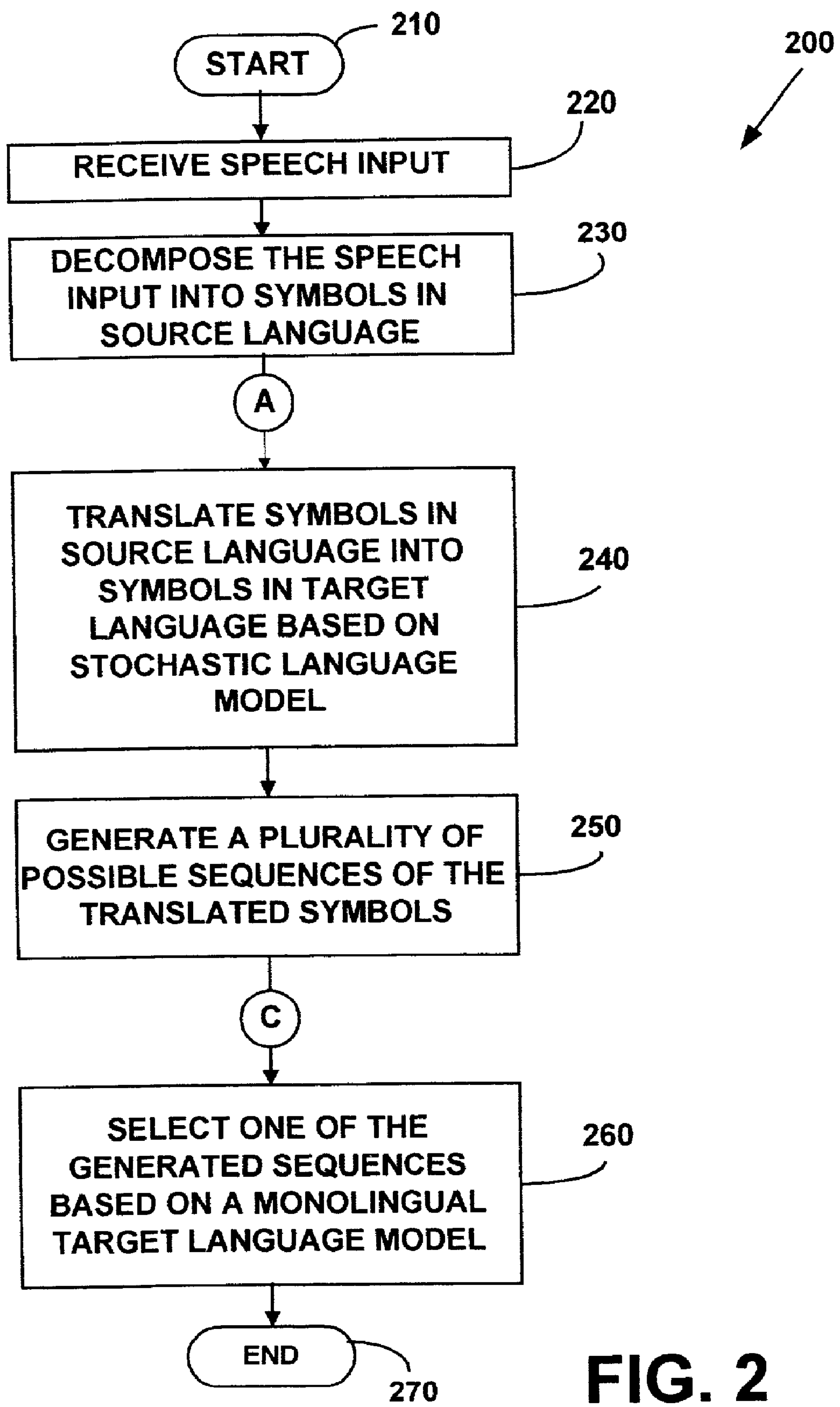
FIG. 2 is a flowchart depicting a method for providing stochastic finite-state machine translation, in accordance with the present invention.

Referring to FIG. 2, an exemplary method for providing stochastic finite-state machine translation 200 is provided, in accordance with the present invention. Starting at step 210, the recognizer 110 receives an input at step 220. Upon receipt of the input, the recognizer 110 decomposes the input into symbols in the source language for SFSM translation at step 230. The lexical selection unit 120 translates one or more symbols in the source language into symbols in the target language based on a stochastic translation model database by referring to the first model database 150 at step 240. The symbols in the target language are then fed into the reordering unit 130. The reordering unit 130 generates a plurality of possible sequences of the translated symbols at step 250. These possible sequences generated at 250 are received by the refining unit 140. Subsequently, the refining unit 140 selects one of the generated sequences with reference to a second model database 160 (a monolingual target language model database) at step 260. The selected sequence represents the most likely translation of the speech input. The process then goes to step 270 and ends. Each of these steps will be described below in greater detail.

Figures 6, 7:
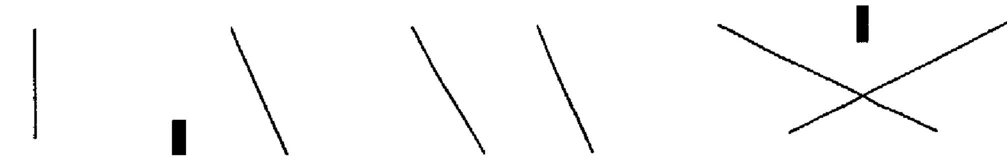
FIG. 6 illustrates exemplary bi-texts in source and target languages used for machine translation performed by the stochastic finite state model shown in FIG. 1, in accordance with the present invention.
FIG. 7 is an alignment information for the bi-texts shown in FIG. 6, used for machine translation in accordance with the present invention.

Still referring to FIG. 2, when the recognizer 110 receives the input at step 220, it is decomposed into source symbols at step 230. The input results in source symbols having a source symbol sequence, $W_S=w_1, \ldots, w_{NS}$ ($w_i \epsilon L_S$). An exemplary excerpt of the input, $W_S$, decomposed into source language symbols is illustrated in FIG. 6. More specifically, in one embodiment of the present invention, the input is decomposed into local (phrase-level) and global (sentence-level) translation models at step 230. The local translation model is learned based on joint entropy reduction of the source and target languages. The global translation model is learned based on a Variable length N-gram Stochastic Automaton (VNSA) learning. The method for joint entropy reduction and the VNSA learning are known to one skilled in the art, and therefore will not be discussed in greater detail.

The decomposed input is then fed into the lexical selection unit 120. At step 240, the lexical selection unit 120 then translates source language symbols into target language symbols by referring to the first model 150. The source language symbols are translated into symbols in the target language on a symbol-by-symbol basis. As is illustrated in FIG. 6, source language symbols that do not have equivalent symbols in the target language are assigned to an empty string, $\epsilon$. However, it should be noted that such symbols are not excluded from the input when source language symbols are translated into target language symbols. The resultant target language symbols have a sequence of $W_T=x_1, \ldots x_{NT}$ ($x_i \epsilon L_T$). An exemplary excerpt of the target language symbols having a sequence $W_T$ is illustrated in FIG. 6.

Below description of the present invention is provided with reference to FIGS. 3, 4 and 5, which are detailed flowcharts illustrating the steps 240 and 250 of FIG. 2 in greater detail. When the input is decomposed into source language symbols, these symbols in the source language are translated into symbols in the target language on a symbol-to-symbol basis. The lexical selection unit 120 then maps the source symbol sequence onto a target language sequence. In one embodiment of the present invention, this is done by automatically learning stochastic automata and transducers to perform the local and/or global model translation, or namely the phrase-level and/or sentence-level translation. In other words, when the input is decomposed into source symbols, each symbol in the source language is translated into a symbol in the target language. In machine translation, however, the linear order of source language symbols, in general, is not the same as the linear order of target language symbols. Thus, an alignment function is obtained at step 310 to map a source symbol sequence onto a target symbol sequence.

In one embodiment of the present invention, the alignment function (FIG. 7), given a pair of source and target language sentences, maps a source word subsequence onto a target word subsequence. One embodiment of the present invention adopts an alignment algorithm known as a phase-based head transduction model. The phase-based transduction model is generally known to one skilled in the art, and thus, will not be discussed in the present application. The alignment algorithm adopted by the present invention takes advantage of hierarchical decomposition of strings and performs a structure-based alignment. However, it should be understood that other alignment algorithms could also be used so long as they provide mapping of a source symbol subsequence onto a target symbol subsequence.

FIG. 6 illustrates exemplary bitexts in source language, $W_S$, and target language, $W_T$, which are used for stochastic finite state machine translation. When the symbol-to-symbol translation is performed, an alignment information is determined by mapping the source word subsequences onto the target word subsequences as is best illustrated in FIG. 6 and FIG. 7. As previously mentioned above, one embodiment of the present invention uses the automatic alignment algorithm to the pair of source and target language sentences in determining the alignment information.

After the alignment information (FIG. 7) is determined, the lexical selection unit 120 transforms the output of the alignment information into a bilanguage string in a bilanguage corpus, $R \epsilon t_B$ at step 320. The string in a bilanguage corpus is represented as follows:

$$R=w_1-x_1;\ w_2-x_2, \ldots w_N-x_N,$$

where $w_i \epsilon L_S \cup e$, $x_i \epsilon L_T \cup e$, e is the empty string and $w_i-x_i$ is the symbol pair drawn from the source and target languages. The string in a bilanguage corpus, R, consists of sequences of tokens. Each token ($w_i$, $x_i$) is represented with two components: a source word, $w_i$, (possibly an empty word) as the first component and the target word, $x_i$, (possibly an empty word) that is the translation of the source word as the second component. FIG. 8 illustrates an exemplary string in a bilanguage corpus, $F(W_S, W_T)$, which includes eight tokens of the bi-language. In one embodiment of the present invention, the tokens of the bi-language are ordered in accordance with the word order of the source language. However, it should be understood that the tokens of a bi-language could be ordered according to either the word order of the source language or the word order of the target language.

Having transformed the alignment information (FIG. 7) for each sentence pair $W_S$ and $W_T$ into a bi-language string R (FIG. 8), the lexical selection unit 120 trains the bi-language string based on a Variable N-gram Stochastic Automaton algorithm at step 330, in accordance with the present invention. More specifically, the corpus, $t_B$, is segmented into bilingual phrases which can be acquired by minimizing the joint entropy $H(L_S, L_T) \cong -1/M \log P(t_B)$. The probability $P(W_S, W_T)=P(R)$ is computed in the same way as n-gram model:

$$P(R)=\Pi P(w_{i}\_x_i | w_{i-n+1}\_x_{i-n+1}, \ldots, w_{i-1}\_x_{i-1}).$$

Using the phrase segmented corpus, a phrase-based variable n-gram translation model is constructed based on the VNSA algorithm. The VNSA is a non-deterministic Stochastic Finite-State Machine (SFSM) that allows for parsing any possible sequence of words drawn from a given vocabulary. In one embodiment of the present invention, the phase-based VNSA target language model is used to retrieve the most likely translation. This step will be described in greater detail hereinafter.

In its simplest implementation, a state q in the VNSA encapsulates the lexical history of a word sequence. The probability of going from state $q_i$ to $q_j$ and recognizing the symbol associated to $q_j$ is given by the state transition probability, $P=(q_j|q_i)$. Stochastic finite-state machines represent in a compact way the probability distribution over all possible word sequences. The probability of a word sequence, W, can be associated to a state sequence $\xi_W^j=q_1, \ldots, q_j$ and to the probability, $P(\xi_W^j)$. By appropriately defining the state space to incorporate lexical and extra-lexical information, the VNSA formalism can generate a wide class of probability distribution (i.e., standard word n-gram, class-based, phrase-based, etc.).

The trained bi-language string is then trained based on bi-phrase learning algorithm at step 340, in accordance with the present invention. Applying the VNSA algorithm to the bilingual corpus, $\tau_B$, introduces the notion of stochastic transducers, $\tau_{ST}$. Stochastic transducers $\tau_{ST}$: $L_{S\_LT} \rightarrow [0, 1]$ map the source string, $W_S \in L_S$, onto the target string, $W_T \in L_T$, and assign a probability to the transduction, $$W_S \overset{\tau_{ST}}{\longrightarrow} W_T.$$

In one embodiment of the present invention, the VNSA algorithm is used to compute a joint model, $$P\left(W_S \overset{\tau_{ST}}{\longrightarrow} W_T\right) = P(W_S, W_T)$$

from the bilingual corpus, $\tau_B$. This is to account for the direct mapping of the source symbols, $W_S$, into the target symbol, $\hat{W}_T$, that is ordered according to the source language order. The symbol pair, $w_i$: $x_i$, is associated to each transducer state q with an input label, $w_i$, and an output label, $x_i$. The stochastic transducers, $\tau_{ST}$, provide a sentence-level transduction from the source symbol sequence, $W_S$, into the target symbol sequence, $W_T$. The integrated sentence-level and phrase-level transduction is then trained directly on the phrase-segmented corpus, $\tau_B^P$.

The stochastic transducers, $\tau_{ST}$, take as an input a sentence, $W_S$. In turn, they output a set of candidate strings in the target language with a source language word order. A maximization step is then carried out with a Viterbi algorithm over the hypothesized strings in $L_T$. Subsequently, a target sentence that is ordered according to the source language word order, $\hat{W}_T$, is selected. The Viterbi algorithm adopts the following equation:

$$\hat{W}_T \arg\max_{W_T} P(W_s, W_T).$$

The target sentence that is ordered according to the source language order, $\hat{W}_T$, is then fed into the reordering unit 130. The present invention applies the monolingual target language model $\lambda_T$ to re-order the sentence $\hat{W}_T$ to produce $\hat{W}_T^*$. In accordance with one embodiment of the present invention, all possible sequences of the translated symbols $\hat{W}_T$ are generated at step 350 as illustrated in FIG. 4. However, this operation is computationally very expensive. To overcome this problem, a set of likely sequences of the target symbols are approximated in accordance another embodiment of the present invention at step 360 as illustrated in FIG. 5. More specifically, a set of the permutations with the word lattice $\lambda_{\hat{W}_T}$ representing $(x_1|x_2| \ldots x_N)^N$ is approximated, where $x_i$ is the words in $\hat{W}_T$.

Referring back to FIG. 2, the last step to complete the translation process is to select the most likely sequence of the target language symbol, which is carried out at step 260. In the former of the aforementioned embodiments, the most likely sequence is selected by searching through all possible permutations of the words in $\hat{W}_T$, which is, as mentioned earlier, computationally very expensive. In the latter embodiment, the most likely string $\hat{W}_T^*$ in the word lattice is then decoded as follows:

$$\begin{aligned}\hat{W}_T^* &= \arg\max\left(\lambda_T \circ \lambda_{\hat{W}_T}\right)\\ &= \arg\max_{\hat{W} \in \lambda_{\hat{W}}} P\left(\hat{W}_T | \lambda_T\right),\end{aligned}$$

where o is the composition operation defined for weighted finite-state machines. The method for speech recognition by composition of weighted finite automata is generally known to one skilled in the art and thus will not be discussed in detail.

The present invention provides architecture for the speech translation in a limited domain based on simple machinery of stochastic finite-state transducers. The method and apparatus for stochastic FST machine translation, in accordance with the present invention, is trained automatically from source-target utterance pairs. The present invention can be used in telecom applications such as call routing. In particular, the present invention can be used for a call type task classification, How May I Help You, which is detailed in U.S. Pat. No. 5,675,707, in sufficiently understanding caller's response to the open-ended prompt "AT&T How May I Help You?" U.S. Pat. No. 5,675,707 is hereby incorporated by reference in its entirety.

The present invention is described above in the context of spoken language translation, it should be understood that the terms "speech", "phrase" and "utterance" may include either verbal and/or non-verbal symbols or units. Therefore, "speech," "phrase" and "utterance" may comprise non-verbal units, verbal units or a combination of verbal and non-verbal units within the spirit and scope of the present invention.

Non-verbal speech may include, but are not limited to gestures, body movements, head movements, non-responses, text, keyboard entries, keypad entries, mouse clicks, DTM codes, pointers, stylus, cable set-top box entries, graphical user interface entries and touchscreen entries, or a combination thereof. Multimodal information is received using multiple channels (i.e., aural, visual, etc.). The user's input communication may also be derived from the verbal and non-verbal speech and the user's or the machine's environment. Basically, any manner of communication falls within the intended scope of the invention. However, for ease of discussion, the present invention is described in the context of verbal speech in the examples and embodiments set forth above.

Additionally, those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method for providing stochastic finite-state machine translation comprising:

receiving an input in a source language;

translating and decomposing the source language input into one or more symbols in a target language based on stochastic translation model;

generating a plurality of possible sequences of the translated symbols; and selecting one of the generated sequences based on a monolingual target language model, wherein the selected sequence represents a most likely translation of the source language input wherein decomposing the source language input into a plurality of symbols further includes decomposing the source language input into phrase level symbols based on joint entropy reduction of the source and target languages.

2. A method for providing stochastic finite-state machine translation comprising:

receiving an input in a source language;

translating and decomposing the source language input into one or more symbols in a target language based on stochastic translation model;

generating a plurality of possible sequences of the translated symbols; and selecting one of the generated sequences based on a monolingual target language model, wherein the selected sequence represents a most likely translation of the source language input further including determining alignment information by mapping the symbols in the source language onto the symbols in the target language.

3. The method of claim 2, wherein translating the source language input into one or more symbols in the target language further includes transforming the alignment information into a bi-language string.

4. The method of claim 3, wherein translating the source language input into one or more symbols in the target language further includes training the bi-language string based on a Variable N-gram Stochastic Automaton (VNSA) learning using stochastic transducers.

5. The method of claim 4, wherein translating the source language input into one or more symbols in the target language further includes training the VNSA trained bi-language string based on a bi-phrase learning algorithm using a bi-language corpus.

6. An apparatus for stochastic finite-state machine translation comprising:

a recognizer for receiving an input in a source language;

a lexical selection unit connected to the recognizer for translating the input in the source language into one or more symbols in a target language with reference to a first model database;

a reordering unit connected to the lexical selection unit for generating a plurality of possible sequences of the translated symbols; and a refining unit connected to the reordering unit for selecting one of the possible sequences of the translated symbols with reference to a second model database, wherein the first model database is a stochastic translation model database, and the second model database is a monolingual target language model database, the recognizer decomposes the input into a plurality of symbols in the source language, and the recognizer decomposes the input in the source language into phrase level symbols based on joint entropy reduction of the source and target languages.

7. An apparatus for stochastic finite-state machine translation comprising:

a recognizer for receiving an input in a source language;

a lexical selection unit connected to the recognizer for translating the input in the source language into one or more symbols in a target language with reference to a first model database;

a reordering unit connected to the lexical selection unit for generating a plurality of possible sequences of the translated symbols; and a refining unit connected to the reordering unit for selecting one of the possible sequences of the translated symbols with reference to a second model database, wherein the first model database is a stochastic translation model database, and the second model database is a monolingual target language model database, the recognizer decomposes the input into a plurality of symbols in the source language, and the lexical selection unit determines an alignment information by mapping the plurality of symbols in the source language into the symbols in the target language.

8. The apparatus of claim 7, wherein the reordering unit generates all possible sequences of the translated symbol based on a Variable Length N-gram Stochastic Automaton model.

9. A method for providing stochastic finite-state machine translation comprising:

receiving an input in a source language;

decomposing the input into a plurality of symbols in the source language;

translating the plurality of symbols into a plurality of symbols in a target language symbol by symbol in accordance with stochastic translation model;

generating a plurality of possible sequences of the symbols in the target language using a Variable N-gram Stochastic Automation algorithm; and selecting one of the possible sequences based on a monolingual target language model.

10. The method of claim 9, wherein the input is decomposed into the plurality of symbols in the source language based on joint entropy reduction of the source and target languages.

11. The method of claim 10, further including determining an alignment information by mapping each of the plurality of symbols in the source language onto the plurality of symbols in the target language.

* * * * *